US008382179B2

(12) United States Patent
Hamilton et al.

(10) Patent No.: US 8,382,179 B2
(45) Date of Patent: Feb. 26, 2013

(54) ENHANCED DISCONNECT HANDLE OPERATORS

(75) Inventors: Jonathan K. Hamilton, Collegeville, PA (US); Robert Allan Morris, Fayetteville, NC (US); Edgar Yee, Chapel Hill, NC (US)

(73) Assignee: Eaton Corporation, Cleveland, OH (US)

( * ) Notice: Subject to any disclaimer, the term of this patent is extended or adjusted under 35 U.S.C. 154(b) by 297 days.

(21) Appl. No.: 12/748,612

(22) Filed: Mar. 29, 2010

(65) Prior Publication Data

US 2011/0232039 A1 Sep. 29, 2011

(51) Int. Cl.
*B25J 1/00* (2006.01)

(52) U.S. Cl. ........................................ 294/210; 294/174

(58) Field of Classification Search .................. 294/174, 294/209, 210, 24; 81/53.1, 124.7, 177.2; 16/426, 427; 15/144.4
See application file for complete search history.

(56) References Cited

U.S. PATENT DOCUMENTS

| | | | | |
|---|---|---|---|---|
| D53,597 S | * | 7/1919 | Marcmann | D8/28 |
| 1,533,784 A | * | 4/1925 | Bellows | 81/124.7 |
| 2,319,992 A | * | 5/1943 | Hubbard | 294/174 |
| 4,580,825 A | * | 4/1986 | Johnson | 294/24 |
| 4,802,702 A | * | 2/1989 | Bownds | 294/65.5 |
| 5,022,283 A | | 6/1991 | Deslandes | |
| 5,444,907 A | | 8/1995 | Becker | |
| 5,634,553 A | | 6/1997 | Hopper et al. | |
| 6,070,924 A | * | 6/2000 | Sweetman | 294/24 |
| 6,199,456 B1 | * | 3/2001 | Hlady | 81/177.2 |
| 6,691,595 B2 | * | 2/2004 | Hsien | 81/124.5 |
| 6,925,686 B2 | * | 8/2005 | Heathcock et al. | 16/429 |
| 2009/0301851 A1 | | 12/2009 | Morris et al. | |
| 2010/0005934 A1 | * | 1/2010 | Guilbault | 81/177.2 |

FOREIGN PATENT DOCUMENTS

| | | | |
|---|---|---|---|
| DE | 29719300 | U1 | 1/1998 |
| FR | 2 754 648 | A1 | 4/1998 |
| GB | 988285 | A | 4/1965 |
| JP | 2609681 | B2 | 5/1997 |

OTHER PUBLICATIONS

European Patent Office, Form PCT/ISA/206, including its Annex "Communication Relating to the Results of the Partial International Search", mailed Aug. 5, 2011, 7 pp.

European Patent Office, International Search Report and Written Opinion, Nov. 18, 2011, 20 pp.

* cited by examiner

*Primary Examiner* — Dean Kramer

(74) *Attorney, Agent, or Firm* — Eckert Seamans Cherin & Mellott, LLC; Carol A. Marmo

(57) ABSTRACT

An extendable device engages and operates a handle mounted on an electrical switching apparatus. The extendable device includes a first linear portion and a second linear portion, each of the first and second linear portions having a first end and a second end, a handle adaptor extending away from the second end of one of the first and second linear portions and a retainer mechanism structured to engage the first linear portion and the second linear portion such that the extendable device can be adjusted to a particular length and maintained at the particular length. The handle adaptor is structured to engage the handle such that the handle can be moved from a first position to a different second position.

5 Claims, 6 Drawing Sheets

FIG. 1
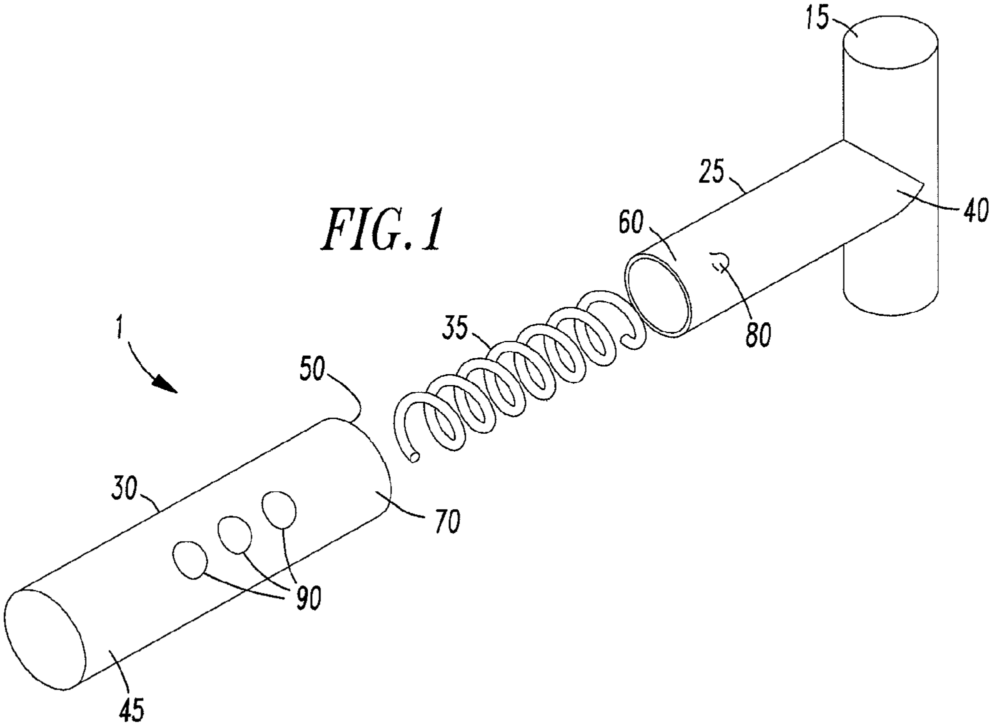
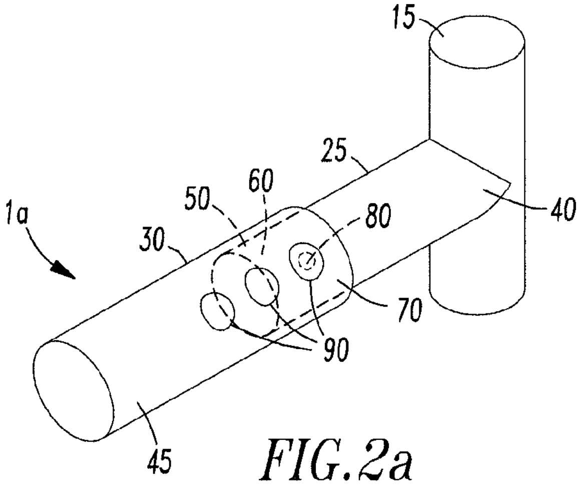
FIG. 2a

ENHANCED DISCONNECT HANDLE OPERATORS

BACKGROUND

1. Field

The disclosed concept pertains generally to handle operators and, more particularly, to handle operators which extend beyond a flash protection boundary of, for example, a motor control center.

2. Background

A flash protection boundary ("FPB") is implemented and regulated to protect those that work around live electrical equipment from severe injury resulting from an arc flash. An arc flash is a type of electrical explosion that can result from a low impedance electrical connection to ground or a voltage phase in an electrical system. For example, when insulation or isolation between electrified conductors is breached or can no longer withstand the applied voltage, an arc flash can occur. An arc flash can cause substantial damage, fire or injury. An enormous amount of concentrated energy can explode outward from the electrical equipment, spreading hot gases, melting metal, causing death or severe burns and creating intense pressure that can damage hearing or brain function and light that can damage eyesight. The fast-moving pressure wave also can send loose material, such as pieces of equipment, metal tools and other objects, flying, injuring anyone standing nearby.

An FPB is calculated to determine the distance surrounding the potential arc point inside which qualified workers must be protected when working. In accordance with the National Fire Protection Association ("NFPA") 70E standard, FPB is defined as the distance from exposed live parts within which a person could receive a second-degree burn if an electrical arc flash were to occur. This standard also defines incident energy as the amount of energy impressed on a surface, a certain distance from the source, generated during an electrical arc event. Incident energy is expressed in calories per cubic centimeter squared (cal/cm$^2$). As workers get closer to the energized equipment, the energy increases. The FPB is different for different types of equipment and depends, in part, on the voltages involved. Typically, the higher the voltages, the larger the danger zone. At voltage levels above 600 volts, the FPB is the distance at which the incident energy is 1.2 cal/cm$^2$, equating to a second-degree burn. For situations where the fault clearing time is 0.1 second (or faster), the FPB is the distance at which the incident energy level equals 1.5 cal/cm$^2$. This is defined by NFPA 70E 130.3(a), second paragraph, and is the burn level at which the skin will just heal without scaring.

In accordance with NFPA regulations, employers are required to perform a hazard analysis to determine FPBs, to provide appropriate protection for employees and to mark with a warning label electrical equipment having a potential for arc flash. A method of determining this boundary is to calculate the magnitude of the arc (a function of the available short circuit current), estimate how long the arc will last (a function of the interrupting time of the fuse or circuit breaker) and then calculate how far away an individual must be to avoid receiving an incident energy of 1.2 cal/cm$^2$.

The FPB distance can be calculated according to EQ. 1 as follows (in accordance with formulae D.3(d) and D.3(e) Modified of NFPA 70E-2004).

$$FPB=53\times MVA_{bf}\times T \qquad \text{(EQ. 1)}$$

wherein:

FPB represents the flash protection boundary in feet;

$MVA_{bf}$ equals $1.732\times V\times I_{sc}\times 0.707/10^6$;

$MVA_{bf}$ represents the bolted fault energy of the arc (MVA);

T represents arcing time (in seconds);

$I_{sc}$ represents bolted short circuit current (in amperes); and

V represents line-to-line voltage (in volts).

All persons crossing the FPB must wear appropriate personnel protective equipment (PPE), such as, but not limited to, protective clothing, for their protection.

In addition to the FPB, there is also a shock protection boundary ("SPB") which includes a limited approach ("LA") distance, a restricted approach ("RA") distance and a prohibited approach ("PA") distance. The LA distance is the distance an unqualified worker must stay away from energized equipment. The RA distance is the distance that a qualified worker must stay away from energized equipment without voltage rated PPE. The PA distance is the distance considered to be the same as actually touching energized equipment.

An FPB is required around electrical equipment, such as switchboards, panelboards, industrial control panels, motor control centers, and similar equipment, when an individual works on or in the proximity of exposed energized (energized and not enclosed, shielded, covered, or otherwise protected from contact) components. This includes conducting activities, such as examination, adjustment, servicing, maintenance or troubleshooting.

In the case of motor control centers, a motor control center ("MCC") generally has an assembly of one or more enclosed sections having a common power bus. An MCC can include several motor starters. An MCC is typically used for low-voltage, three-phase, alternating current motors from about 230 volts to about 600 volts. An FPB is calculated for the MCC, and therefore, a worker must typically enter the FPB to perform operations and maintenance on the MCC unit.

The implementation and regulation of FPBs and the provision of PPE afford protection for workers that are required to work in hazardous areas. However, there is room for improvement in removing workers from a hazardous zone. For example, the use of long-handled tools can allow the worker to perform certain operations from outside of the FPB.

SUMMARY

These needs and others are met by embodiments of the disclosed concept, which provide a device having at least one handle adaptor for engaging and operating a handle mounted on an electrical switching apparatus.

In an aspect of the disclosed concept, an extendable device for engaging and operating a handle mounted on an electrical switching apparatus is provided. The extendable device includes a first linear portion having a first end and a second end, the first linear portion extending therebetween, and a second linear portion having a first end and a second end, the second linear portion extending therebetween, the second linear portion having an inside surface that forms a chamber and having an inside distance greater than an outside distance of the first linear portion such that the first linear portion is structured to linearly move toward and away from the chamber of the second linear portion; a handle adaptor extending away from the second end of one of the first and second linear portions; and a retainer mechanism structured to engage the first linear portion and the second linear portion such that the extendable device can be adjusted to a particular length and maintained at the particular length, wherein the handle adaptor is structured to engage the handle such that the handle can be moved from a first position to a different second position.

In another aspect of the disclosed concept, a device for engaging and operating a handle mounted on an electrical switching apparatus is provided. The device includes a linear portion having a first end and a second end, the linear portion extending therebetween; a first handle adaptor extending away from the first end of the linear portion; and a second handle adaptor extending away from the second end of the linear portion, wherein each of the first handle adaptor and the second handle adaptor is structured to engage the handle such that the handle can be moved from a first position to a different second position.

In still another aspect of the disclosed concept, an extendable device for engaging and operating a handle mounted on an electrical switching apparatus is provided. The extendable device includes a first linear portion having a first end and a second end, the first linear portion extending therebetween, and a second linear portion having a first end and a second end, the second linear portion extending therebetween, the second linear portion having an inside surface that forms a chamber and having an inside distance greater than an outside distance of the first linear portion such that the first linear portion is structured to linearly move toward and away from the chamber of the second linear portion; a first handle adaptor extending away from the second end of the first linear portion; a second handle adaptor extending away from the second end of the second linear portion; a spring mechanism disposed between the first and second linear portions, the spring mechanism structured to exert a force to linearly move the first linear portion away from the chamber of the second linear portion; and a retainer mechanism structured to engage the first linear portion and the second linear portion such that the extendable device can be adjusted to a particular length and maintained at the particular length, wherein at least one of the first handle adaptor and the second handle adaptor is structured to engage the handle such that the handle can be moved from a first position to a different second position.

BRIEF DESCRIPTION OF THE DRAWINGS

A full understanding of the disclosed concept can be gained from the following description of the preferred embodiments when read in conjunction with the accompanying drawings in which:

FIG. 1 is an isometric view of an extendable handle operator in accordance with an embodiment of the disclosed concept.

FIG. 2*a* is an isometric view of an extendable handle operator wherein the handle operator is fully extended in accordance with an embodiment of the disclosed concept.

DESCRIPTION OF THE PREFERRED EMBODIMENTS

Figure 2B:
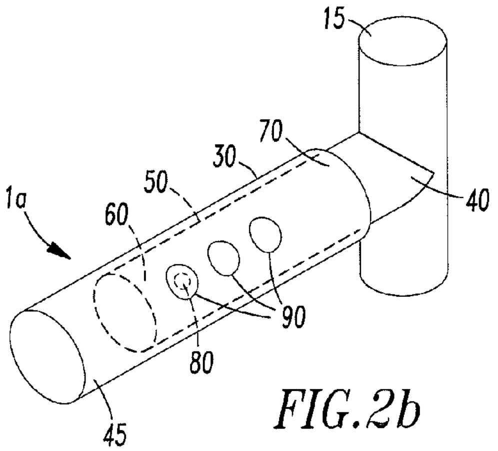
FIG. 2*b* is an isometric view of the extendable handle operator of FIG. 2*a*, wherein the handle operator is fully contracted.

The disclosed concept is described in association with a handle operator for a motor control center, although the disclosed concept is applicable to handle operators for a wide range of electrical equipment and systems.

Directional phrases used herein, such as, for example, “left,” “right,” “top,” “bottom,” “upper,” “lower,” “front,” “back,” “forward,” “above,” “below,” “clockwise,” “counterclockwise” and derivatives thereof, relate to the orientation of the elements shown in the drawings and are not limiting to the claims unless expressly recited therein.

As employed herein, the statement that two or more parts are “coupled” or “connected” together shall mean that the parts are joined together either directly or joined through one or more intermediate parts.

As employed herein, the term “number” shall mean one or an integer greater than one (i.e., a plurality).

FIG. 1 shows extendable handle operator 1. In FIG. 1, the handle operator 1 is structured to have a linear shape. The handle operator 1 includes a first linear portion 25 and a second linear portion 30. The first linear portion 25 extends from a first end 60 to a second end 40. The second linear portion 30 extends from a first end 70 to a second end 45. The linear portions 25, 30 can have various shapes, such as, for example and without limitation, cylindrical or rectangular. The example second linear portion 30 is tube-like and has a linear wall that forms a chamber 50. The chamber 50 can be sized such that the first linear portion 25 can be slidably disposed at least partially within the chamber 50. For example, the second linear portion 30 can have an inside distance that is larger than the outside distance of the first linear portion 25. In an embodiment, the inside diameter of the second linear portion 30 can be greater than the outside diameter of the first linear portion 25. The first end 70 of the second linear portion 30 can be structured to receive the first end 60 of the first linear portion 25.

The handle operator 1 has a spring mechanism 35 disposed between the first and second linear portions 25,30, and exerts a force to bias the first linear portion 25 away from the chamber 50 of the second linear portion 30. The spring mechanism 35 can include various designs known in the art. The example spring mechanism 35 is a coil spring which is disposed within the chamber 50 of the second linear portion 30 and biases the first linear portion 25. The spring mechanism 35 allows the first linear portion 25 to extend and contract such that the length of the handle operator 1 is extendable and contractable. Further, the handle operator 1 has a retainer mechanism which allows the handle operator 1 to be adjusted to various lengths to maintain the handle operator 1 at a desired length. The example retainer mechanism includes a nub 80 formed on the first linear portion 25 and detents 90 formed on the second linear portion 30. The nub 80 is biased upward to engage one of detents 90. It will be appreciated that a wide range of different retainer mechanisms can be employed. For example, the retainer mechanism can include a double nub and detent formation such that two nubs are formed on a first linear portion and are each positioned 180° apart, and two sets of detents are formed on a second linear portion and each set is positioned 180° apart. The second end 40 of the first linear portion 25 is structured to engage a handle adapter 15. Alternatively, the second end 45 of the second linear portion 30, can engage the same or similar or different handle adaptor. The example handle adaptor 15 extends away from (e.g., without limitation, perpendicular from) the second end 40 of the first linear portion 25. The handle operator 1 can be fabricated such that the handle adaptor 15, the second end 40 and the first linear portion 25 are formed as a single piece or structure. Alternatively, the handle adaptor can be fabricated as a separate piece or structure and connected or otherwise coupled to the second end 40 of the first linear portion 25 by a connector 65 (shown in FIG. 3). The handle adaptor 15 can be connected or otherwise coupled to the second end 40 using various conventional techniques known in the art. The handle adaptor 15 is structured to engage at least a portion of a handle (not shown) on a piece of electrical equipment (not shown), such as, for example and without limitation, a disconnect handle 310 (shown in FIGS. 7*a* and 7*b*) on a motor control center unit (shown in FIGS. 7*a* and 7*b*). The size and shape of the handle adaptor 15 can depend on the size and shape of the corresponding handle to be engaged.

The lengths of the first and second linear portions 25,30 and the spring mechanism 35 can vary and can depend on the flash protection boundary ("FPB") which surrounds particular electrical equipment or systems (not shown). For example, the lengths of the first and second linear portions 25, 30 and the spring mechanism 35 can be such that the total length of the handle operator 1 is extendable beyond the FPB. The example handle operator 1 can be fully extended, fully contracted, or partially extended and contracted. In FIG. 1, the handle operator 1 has an example spring-loaded, plunger-like, detent design.

FIGS. 2*a* and 2*b* show another handle operator 1*a* having the first linear portion 25, the second linear portion 30, the first end 60 and the second end 40 of the first linear portion 25, the first end 70 and the second end 45 of the second linear portion 30, the chamber 50, the nub 80, the detents 90 and handle adaptor 15, as shown in FIG. 1. The handle operator 1*a* in FIGS. 2*a* and 2*b* does not include the spring mechanism 35, as shown in FIG. 1. FIG. 2*a* shows the handle operator 1*a* fully extended, and FIG. 2*b* shows the handle operator 1*a* fully contracted. In FIG. 2*a*, when handle operator 1*a* is fully extended, only a small length of the first linear portion 25 is disposed within the chamber 50 of the second linear portion 30. In FIG. 2*b*, when handle operator 1*a* is fully contracted, nearly the entire length of the first linear portion 25 is disposed within the chamber 50 of the second linear portion 30.

Figure 3:
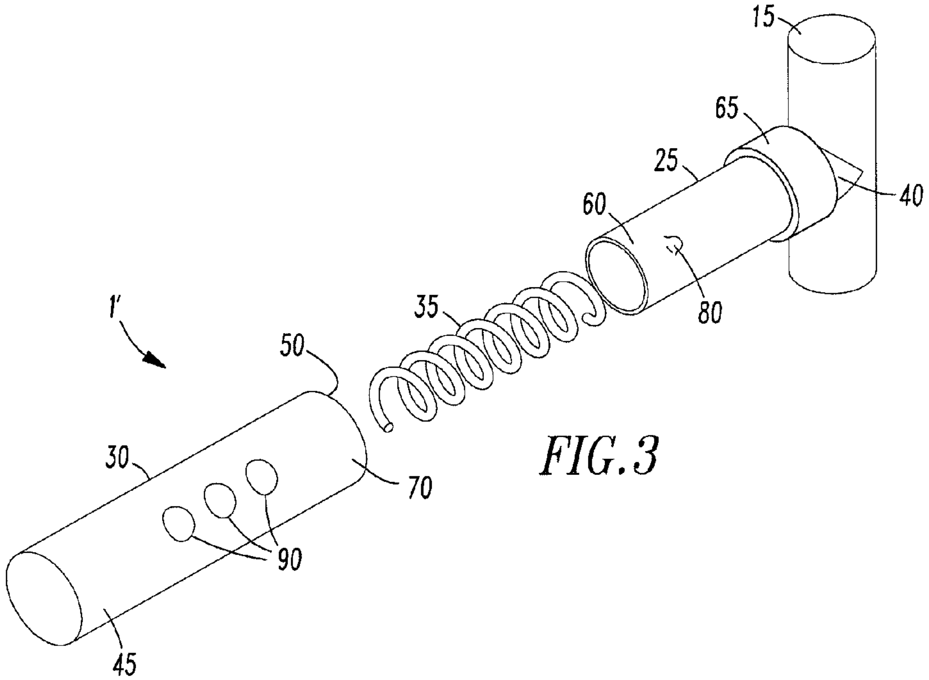
FIG. 3 is an isometric view of an extendable handle operator, wherein the handle adaptor is connected to the handle operator by a connector mechanism in accordance with another embodiment of the disclosed concept.

FIG. 3 shows another handle operator 1' having the respective first and second linear portions 25, 30, the respective first and second ends 60, 40 of the first linear portion 25, the respective first and second ends 70, 45 of the second linear portion 30, the chamber 50, the nub 80, the detents 90, the spring mechanism 35 and the handle adaptor 15, as shown in FIG. 1. FIG. 3 further shows a connector 65 which couples the handle adaptor 15 to the second end 40 of the first linear portion 25. The connector 65 is fabricated as a separate piece or structure from the handle adaptor 15 and the first linear portion 25. For example, the connector 65 can be structured to receive a variety of handle adaptors having different sizes and/or shapes that can be interchangeable with handle adaptor 15.

Figure 4:
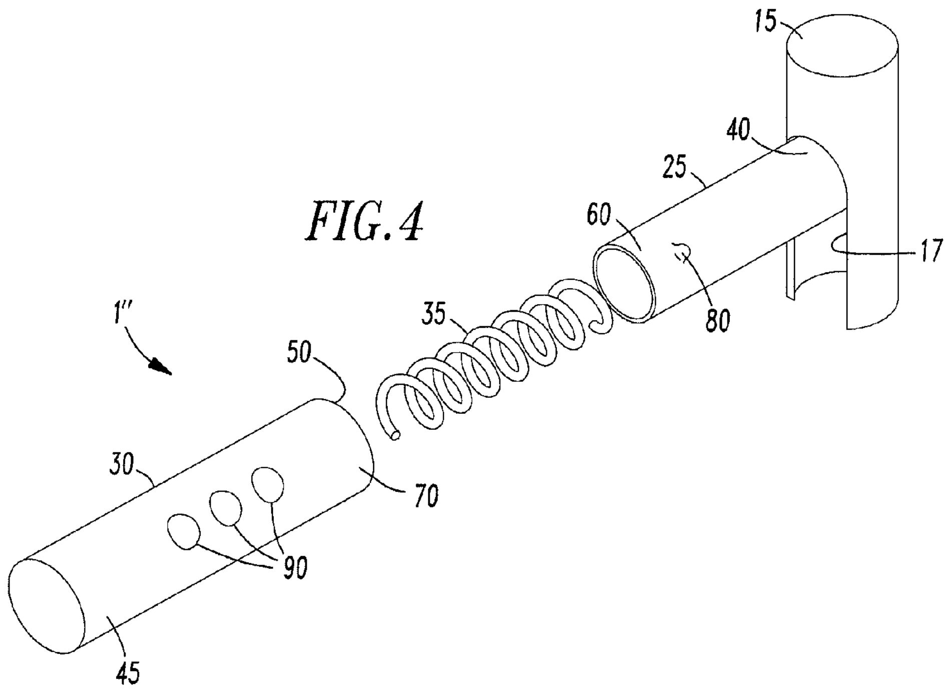
FIG. 4 is an isometric view of an extendable handle operator, wherein the handle adaptor includes an aperture formed therein in accordance with another embodiment of the disclosed concept.

FIG. 4 shows another handle operator 1" having the respective first and second linear portions 25, 30, the respective first and second ends 60, 40 of the first linear portion 25, the respective first and second ends 70, 45 of the second linear portion 30, the chamber 50, the nub 80, the detents 90, the spring mechanism 35 and the handle adaptor 15, as shown in FIG. 1. FIG. 4 further shows an aperture 17 formed in the handle adaptor 15 for use in engaging a handle (not shown). The size and shape of the aperture 17 can vary depending on the size and shape of the corresponding handle to be engaged. In one embodiment, the aperture 17 can be a key-type slot having essentially the same profile as the corresponding handle to be engaged. The handle adaptor 15 can be fitted over at least a portion of the corresponding handle to be engaged such as the disconnect handle 310 (shown in FIGS. 7*a* and 7*b*).

Figure 5:
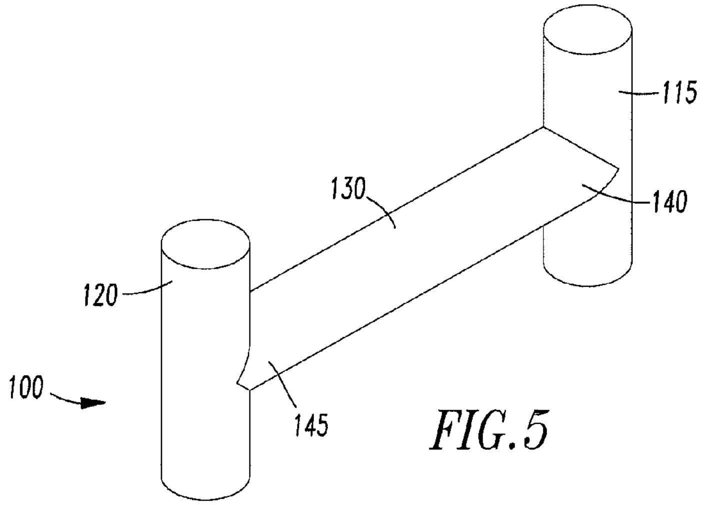
FIG. 5 is an isometric view of a non-extendable handle operator having two handle adaptors in accordance with another embodiment of the disclosed concept.

FIG. 5 shows a non-extendable handle operator 100 in accordance with an embodiment of the disclosed concept. The handle operator 100 is structured to have a linear shape. The handle operator 100 includes a linear portion 130. The linear portion 130 extends from a first end 140 to a second end 145. The linear portion 130 can have various shapes, such as, for example, cylindrical or rectangular. Further, the length of linear portion 130 can vary and can depend on the FPB that surrounds particular electrical equipment or systems (not shown). For example, the length of linear portion 130 can be such that the length of handle operator 100 is greater than the length of the FPB. The first end 140 and the second end 145 can be structured to engage a respective first handle adapter 115 and a second handle adaptor 120. The example first and second handle adaptors 115, 120 each extend away from (e.g., without limitation, perpendicular) from the first end 140 and second end 145, respectively, of the linear portion 130. The first and second handle adaptors 115, 120 can be connected or otherwise coupled to the respective first and second ends 140, 145 using various conventional techniques known in the art. Each of the first and second handle adaptors 115, 120 are structured to engage at least a portion of a handle (not shown) on a piece of electrical equipment (not shown), such as, for example, a disconnect handle 310 (shown in FIGS. 7*a* and 7*b*) on a motor control center unit (shown in FIGS. 7*a* and 7*b*). The size and shape of the first and second handle adaptors 115, 120 can depend on the size and shape of the corresponding handle to be engaged. In an embodiment, the first handle adaptor 115 can be designed to engage a particular handle style, and the second handle adaptor 120 can be designed to engage a different handle style.

Figure 5A:
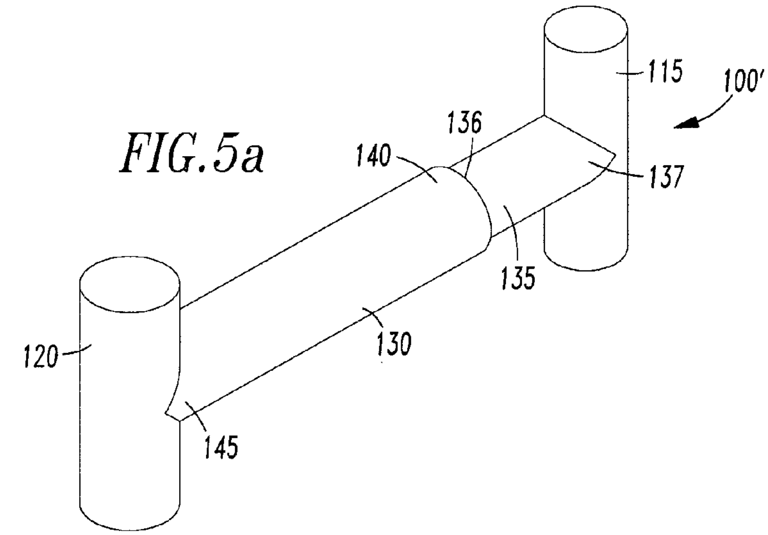
FIG. 5*a* is an isometric view of a handle operator having a fixed extension portion and two handle adaptors in accordance with another embodiment of the disclosed concept.

FIG. 5*a* shows handle operator 100' in accordance with an embodiment of the disclosed concept. The handle operator 100' has the linear portion 130, the first end 140, the second end 145, the first handle adaptor 115 and the second handle adaptor 120, as shown in FIG. 5. FIG. 5*a* further shows a fixed extension portion 135 having a first end 136 and a second end 137. The first end 136 of the fixed extension portion 135 is connected or otherwise coupled to the first end 140 of the linear portion 130. The second end 137 of the fixed extension portion 135 is connected or otherwise coupled to the handle adaptor 115. As an alternate embodiment (not shown), the first end 136 of the fixed extension portion 135 can be connected or otherwise coupled to the second end 145 of the linear portion 130 and the second end 137 of the fixed extension portion 135 can be connected or otherwise coupled to the second handle adaptor 120.

Figure 6:
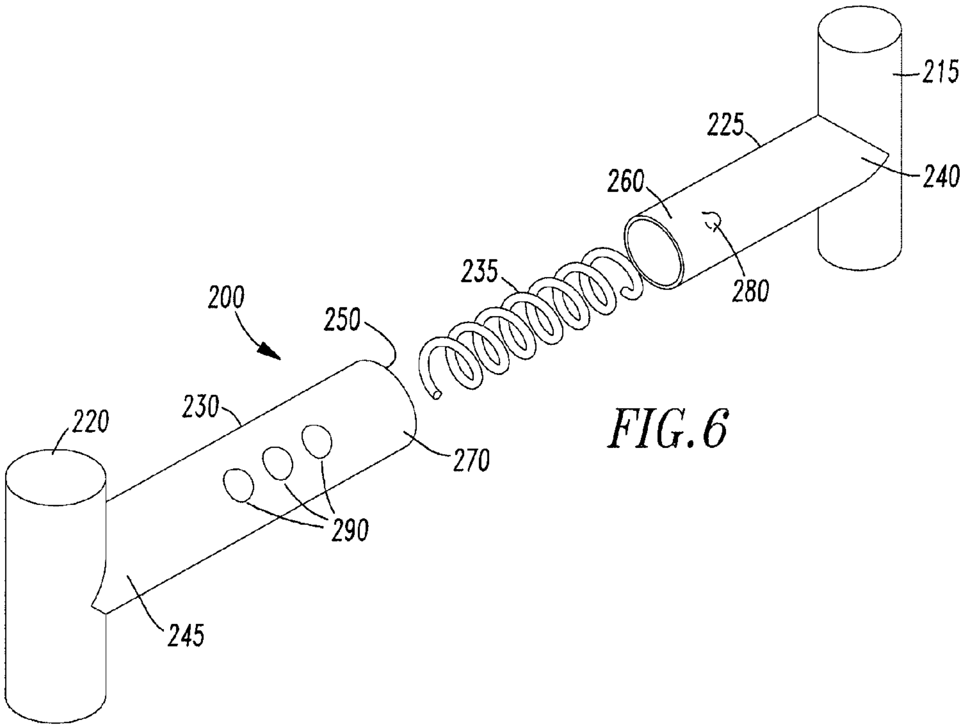
FIG. 6 is an isometric view of an extendable handle operator having two handle adaptors in accordance with another embodiment of the disclosed concept.

FIG. 6 shows a handle operator 200 structured to have a linear shape. The handle operator 200 includes a first linear portion 225 and a second linear portion 230. The first linear portion 225 extends from a first end 260 to a second end 240. The second linear portion 230 extends from a first end 270 to a second end 245. The linear portions 225,230 can have various shapes, such as, for example and without limitation, cylindrical or rectangular. The example second linear portion 230 is tube-like and has a linear wall that forms a chamber 250. The chamber 250 can be sized such that the first linear portion 225 can be slidably disposed at least partially within the chamber 250. For example, the second linear portion 230 can have an inside distance that is larger than the outside distance of the first linear portion 225. In an embodiment, the inside diameter of the second linear portion 230 can be greater than the outside diameter of the first linear portion 225. The first end 270 of the second linear portion 230 can be structured to receive the first end 260 of the first linear portion 225.

The example handle operator 200 has a spring mechanism 235 disposed between the first and second linear portions 225,230, in order to bias the first linear portion 225 away from the chamber 250 of the second linear portion 230. The spring mechanism 235 can include various designs known in the art. The example spring mechanism 235 is a coil spring which is disposed within the chamber 250 of the second linear portion 230 and biases the first linear portion 225. The spring mechanism 235 allows the first linear portion 225 to extend and contract such that the length of the handle operator 200 is extendable and contractable. Further, the handle operator 200 has a retainer mechanism which allows the handle operator 200 to adjust to various lengths and to maintain the handle operator 200 at a desired length. The example retainer mechanism includes a nub 280 formed on the first linear portion 225 and detents 290 formed on the second linear portion 230. The nub 280 is biased upward to engage one of detents 290. The second end 240 of the first linear portion 225 is structured to engage a first handle adapter 215. The second end 245 of the second linear portion 230 is structured to engage a second handle adaptor 220. The example first and second handle adaptors 215, 220 extend away from (e.g., without limitation, perpendicular from) the respective second ends 240, 245 of the respective first and second linear portions 225, 230. The first and second handle adaptors 215, 220 can be connected or otherwise coupled to the respective second ends 240, 245 using various conventional techniques known in the art. The first and second handle adaptors 215, 220 are structured to engage at least a portion of a handle (not shown) on a piece of electrical equipment (not shown), such as, for example, a disconnect handle 310 (shown in FIGS. 7*a* and 7*b*) on a motor control center unit (shown in FIGS. 7*a* and 7*b*). The size and shape of the first and second handle adaptors 215, 220 can depend on the size and shape of the corresponding handle to be engaged. In an embodiment, the first handle adaptor 215 can be designed to engage a particular handle style and the second handle adaptor 220 can be designed to engage a different handle style.

Figure 6A:
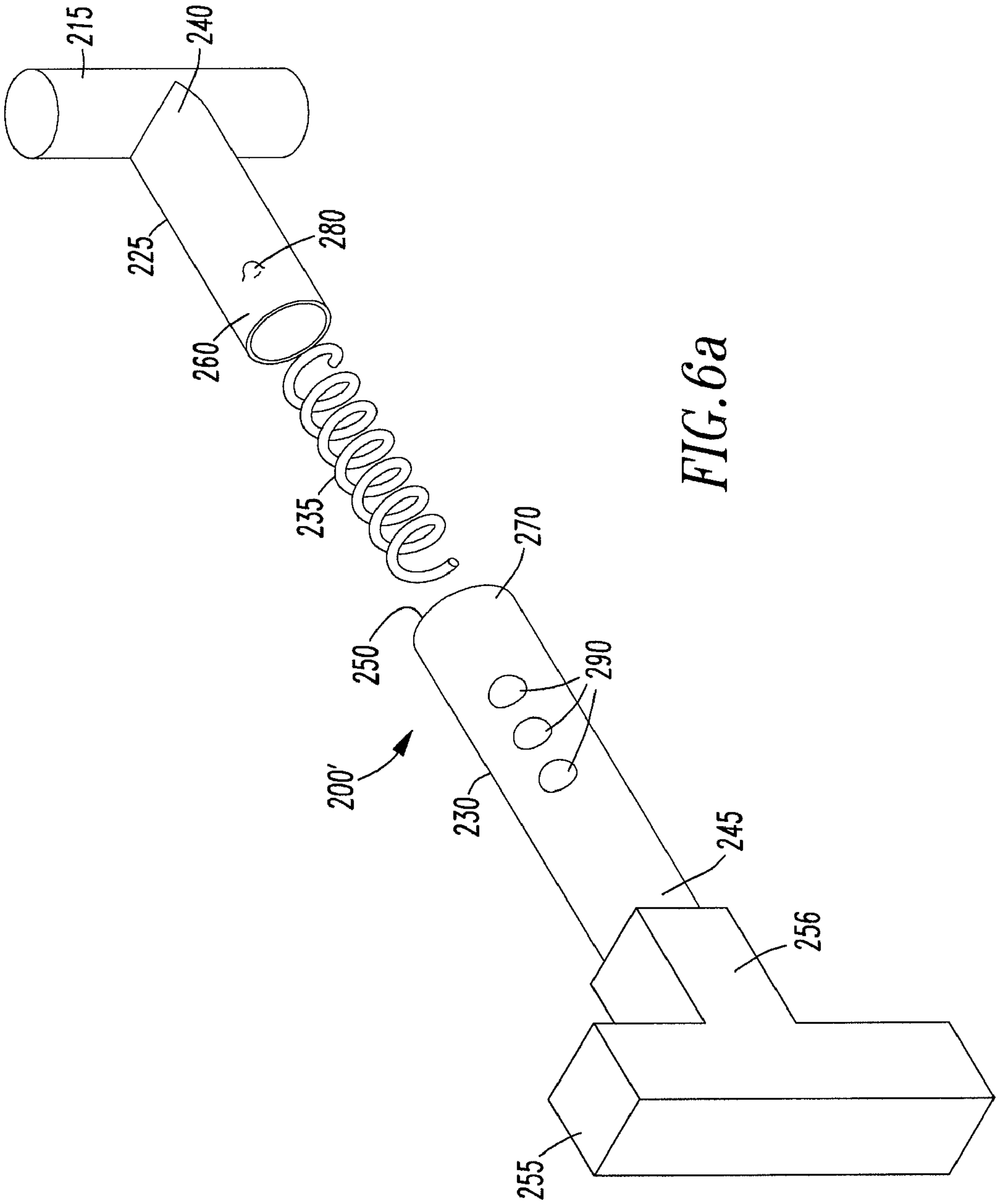
FIG. 6*a* is an isometric view of an extendable handle operator having a gripping handle and one handle adaptor in accordance with another embodiment of the disclosed concept.

FIG. 6*a* shows handle operator 200' in accordance with an embodiment of the disclosed concept. The handle operator 200' has the first linear portion 225, the second linear portion 230, the first and second ends 260,240, respectively, of the first linear portion 225, the first and second ends 270,245, respectively, of the second linear portion 230, the chamber 250, the spring mechanism 235, the nub 280, the detents 290 and the first handle adaptor 215 as shown in FIG. 6. FIG. 6*a* further shows a gripping handle 255. The gripping handle 255 is T-shaped and has an end 256. The end 256 of the gripping handle 255 is connected or otherwise coupled to the second end 245 of the second linear portion 230. The gripping handle 255 provides a mechanism for an operator to hold or grasp, e.g., with two hands, the handle operator 200' to rotate the handle operator 200' and correspondingly rotate a handle such as the disconnect handle 310 (shown in FIGS. 7*a* and 7*b*). The shape of the gripping handle 255 is not limiting; i.e., a T-shape shown in FIG. 6*a* is merely illustrative. The gripping handle 255 can be structured in a wide variety of designs and configurations. In an alternate embodiment (not shown), the end 256 of gripping handle 255 can be connected or otherwise coupled to the first end 240 of the first linear portion 225 and the handle adaptor 220 (shown in FIG. 6) can be connected or otherwise coupled to the second end 245 of the second linear portion 230.

Figure 7A:
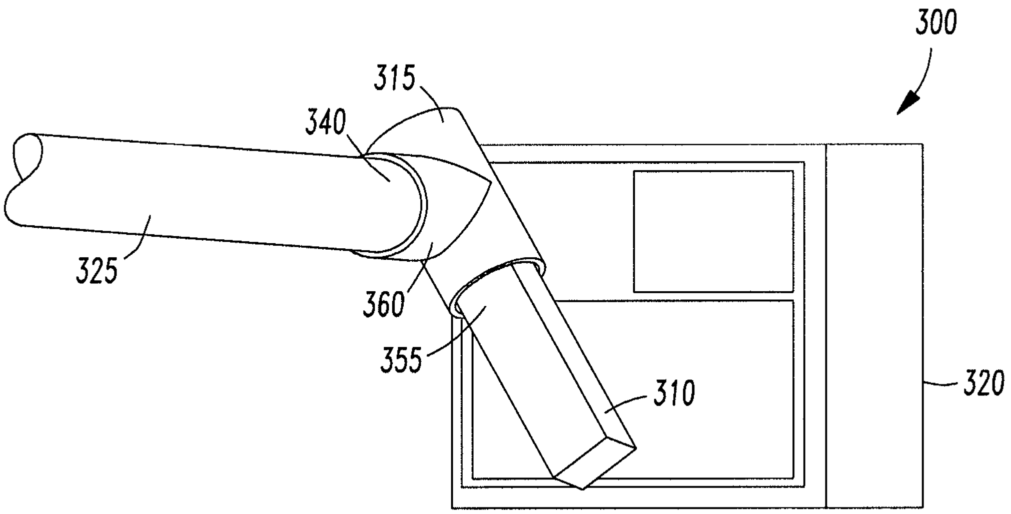
FIGS. 7*a* and 7*b* are isometric views of a handle operator, wherein the handle operator is engaged with a motor control center disconnect handle in different operational positions in accordance with another embodiment of the disclosed concept.
Figure 7B:
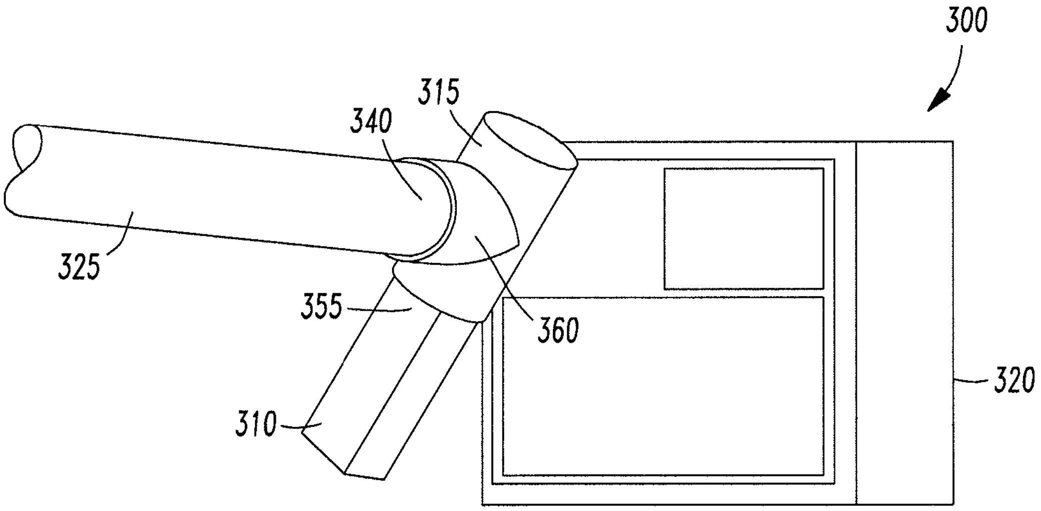

FIGS. 7*a* and 7*b* show a handle operator 300 is structured to have a linear shape. The handle operator 300 includes a linear portion 325 which extends from a first end 340 to a second end (not shown). The first end 340 of the linear portion 325 is structured to engage a handle adapter 315. The example handle adaptor 315 extends away from (e.g., without limitation, perpendicular from) the first end 340 of the linear portion 325. The handle adaptor 315 can be connected to the first end 340 using various conventional techniques known in the art. The example handle adaptor 315 is connected or otherwise coupled to the first end 340 using a connector 360. The handle adaptor 315 is structured to engage the upper portion 355 of the disconnect handle 310, or a somewhat different upper end (not shown) of a different disconnect handle (not shown). The handle 310 is pivotally mounted (pivot not shown) on the motor control center unit 320. The linear portion 325 is horizontally aligned with the pivot point (not shown) of the corresponding handle 310 to be engaged. The size and shape of the handle adaptor 315 can depend on the size and shape of the upper portion 355 of the handle 310 to be engaged. An operator (not shown) can move the handle operator 300 to correspondingly switch the disconnect handle 310 clockwise from a first position shown in FIG. 7*a* to a different second position shown in FIG. 7*b*. FIGS. 7*a* and 7*b* show one handle 310 mounted on a motor control center unit 320. It will be appreciated that the configuration of the motor control center can include a plurality of units and each unit can include a disconnect handle mounted thereon.

It will be appreciated that an operator can be located outside of the FPB (not shown), which is established for the motor control center unit 320 such that the operator holds the handle operator 300 which has a length that is greater than the length of the FPB.

The example handle operators 1, 1*a*, 1', 1", 100, 100', 200, 200' and 300 can be constructed of various materials known in the art including durable, rigid materials. Suitable materials for the linear portions 25, 30, 130, 255, 230 and 340 can include polyester pull traded forms or extruded thermo-plastic polymers. The materials may be glass filled. Further, the material will include an electrically-insulative material. Then handle adaptors 15, 20, 115, 120, 215, 220 and 315 can be constructed of metal or plastic. If constructed of an electrically-conductive material, the handle adaptor material will also include an electrically-insulative material. The fixed extension 135 can be constructed of any of these materials which are suitable for the linear portions 25, 30, 130, 255, 230 and 340. The gripping handle can be constructed of a wide variety of materials and can include any of these materials which are suitable for the handle adaptors 15, 20, 115, 120, 215, 220 and 315.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. An extendable device for engaging and operating a handle mounted on an electrical switching apparatus, said extendable device comprising:

a first linear portion having a first end and a second end, said first linear portion extending therebetween, and a second linear portion having a first end and a second end, said second linear portion extending therebetween, said second linear portion having an inside surface that forms a chamber and having an inside distance greater than an outside distance of said first linear portion such that said first linear portion is structured to linearly move toward and away from said chamber of said second linear portion;

a handle adaptor extending away from said second end of one of said first and second linear portions;

a spring mechanism disposed between said first and second linear portions and disposed within said chamber of said second linear portion, said spring mechanism structured to exert a force to linearly move said first linear portion away from said chamber of said second linear portion; and a retainer mechanism structured to engage said first linear portion and said second linear portion such that the extendable device can be adjusted to a particular length and maintained at said particular length, said retainer mechanism comprising at least one nub biased upward, said nub positioned on an outer surface of said first linear portion and a plurality of detents formed in said second linear portion, each of said plurality of detents structured to engage said at least one nub, wherein the handle adaptor is structured to engage said handle such that the handle can be moved from a first position to a different second position.

2. An extendable device for engaging and operating a handle mounted on an electrical switching apparatus, said extendable device comprising:

a first linear portion having a first end and a second end, said first linear portion extending therebetween, and a second linear portion having a first end and a second end, said second linear portion extending therebetween, said second linear portion having an inside surface that forms a chamber and having an inside distance greater than an outside distance of said first linear portion such that said first linear portion is structured to linearly move toward and away from said chamber of said second linear portion;

a first handle adaptor extending away from said second end of said first linear portion;

a second handle adaptor extending away from said second end of said second linear portion;

a spring mechanism disposed between said first and second linear portions, said spring mechanism structured to exert a force to linearly move said first linear portion away from said chamber of said second linear portion; and a retainer mechanism structured to engage said first linear portion and said second linear portion such that the extendable device can be adjusted to a particular length and maintained at said particular length, said retainer mechanism comprising at least one nub biased upward, said nub positioned on an outer surface of said first linear portion and a plurality of detents formed in said second linear portion, each of said plurality of detents structured to engage said at least one nub, wherein at least one of said first handle adaptor and said second handle adaptor is structured to engage said handle such that the handle can be moved from a first position to a different second position.

3. The extendable device of claim 2, wherein said extendable device is extendable to a length that extends beyond a flash protection boundary of the electrical switching apparatus.

4. The extendable device of claim 2, wherein said one of said first and said second handle adaptors is structured to engage a first handle design and the other handle adaptor is structured to engage a different second handle design.

5. The extendable device of claim 2, wherein said extendable device is constructed of an electrically insulative material.

* * * * *